Nov. 11, 1947.    R. W. HODGE    2,430,613
WORK HOLDING MEANS
Filed March 15, 1945
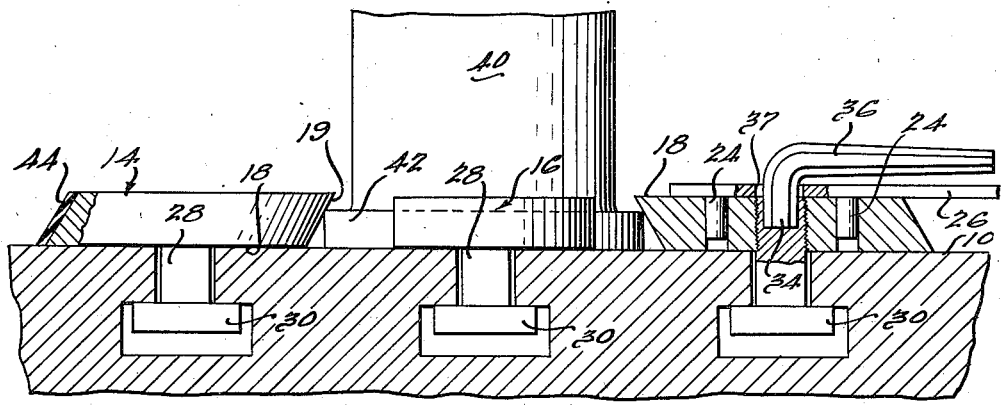
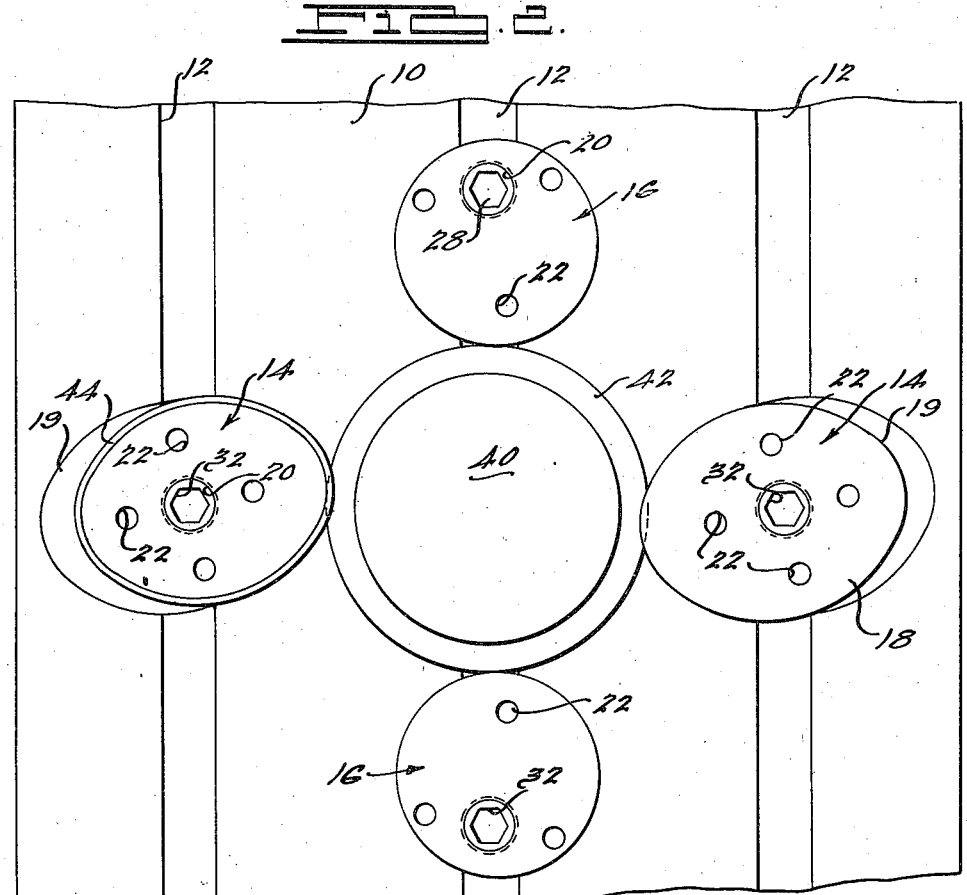
INVENTOR.
Robert W. Hodge.
BY
Edwin J. Balluff
ATTORNEY.

Patented Nov. 11, 1947

2,430,613

UNITED STATES PATENT OFFICE 2,430,613

WORK HOLDING MEANS

Robert W. Hodge, Lake Angelus, Mich.

Application March 15, 1945, Serial No. 582,976

6 Claims. (Cl. 90—60)

This invention relates to work holding means and has particular reference to a new and useful means for holding work on T-slotted surfaces on machines such as grinders, planers, milling machines, boring mills, etc., and on slotted face plates, such as on lathes.

Broadly, the invention consists of a system or combination of eccentric wedges, eccentric stops, and socket-ended cap screws constructed so as to be useful in accordance with the disclosure hereinafter set forth.

Principal objects of the invention are to provide:

A new and improved means for holding work on slotted machine surfaces;

A new and useful means for holding work on machine surfaces which is constructed and arranged so that a wedging action can be applied to the work for securely holding the same;

A work holding means characterized by the absence of projecting nuts and bolts;

A work holding means constructed and arranged to enable the work to be set up and secured from the top side thereof accessible to the workman;

A work holding means permitting eccentric setups on angle plates;

A work holding means permitting setups for production runs without special fixtures;

A wedge block work holder.

Other and further objects of the invention will be apparent from the following description and claims and will be understood by reference to the accompanying drawings, of which there is one sheet, which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings

Fig. 1 is a fragmentary plan view of the slotted work surface of a machine with my invention applied thereto; and Fig. 2 is a cross sectional view of the apparatus as illustrated in Fig. 1.

Machines of the character referred to generally include a machine surface or plate 10 having a series of parallel T-slots 12 open at at least one end of the surface 10. A work holding means or work holder embodying my invention comprises one or more eccentric wedge blocks 14 and/or 16. Each of the wedge blocks 14 may comprise a body having parallel faces 18, the configuration of which may conform to one of the conic sections, such as a circle, ellipse, parabola, or hyperbola, the ones illustrated being elliptical.

The peripheral side 19 of the body of the wedge blocks 14 has an angularity with relation to the planes of the surfaces 18, varying from ninety degrees at the minor diameter to any angle less than ninety degrees and more than zero degrees at one side thereof and to more than ninety degrees but less than one hundred eighty degrees on the other side thereof. On each side of the major diameter, the wedge block 14 is symmetrical. With this construction the wedge block 14 may be used with either side up.

The body of the wedge is provided with a threaded hole 20 normal to the faces 18 and arranged generally at the intersection of the major and minor diameters of the body of the wedge 14. As illustrated, the radial distance from the center of the hole 20 to the side 19 of the wedge body increases from the minor diameter to the major diameter on one side of the minor diameter, and coincidentally the angularity of the side 19 of the wedge body to the machine surfaces 10 decreases.

The body is provided with a plurality of holes 22 to receive the pegs or lugs 24 projecting from one face of a wrench 26, as illustrated in Fig. 2. The threaded hole 20 is adapted to receive the threaded end of a cap screw 28 having a head 30 positioned in the enlarged portion of the T-slot and arranged so as to react against the shoulders of the surface 10 which overlie the enlarged portion of the T-slot.

The threaded end of the cap screw is recessed to form a wrench socket 32 for receiving the complementary shaped end 34 of a wrench 36, (through a hole 37 in the wrench 26), as illustrated in Fig. 2, so that rotation of the cap screw 28 in one direction about its axis by means of the wrench 36 will clamp the body of the wedge 14 to the surface 10 while the rotation in a reverse direction will release the clamping effect between the surface 10 and the body of the wedge 14 produced by the cap screw 28. The threads of the cap screw and of the tapped hole 20 preferably are arranged so that the clamping pressure on the wedge body will increase by turning the body of the wedge 14 in a clockwise direction (Fig. 1) relative to the cap screw 28. This may be done by employing the arrangement of wrenches 26 and 36 as illustrated in Fig. 2. The wrench 36 and socket 32 may be of the Allen, Bristol, or Holo-Krome type now commercially available.

The wedge blocks 14 may be initially positioned relative to the work 40 so that the major axis of the wedge body 14 is to one side of the shortest line between the center of the cap screw 28 and the work so that as the body of the wedge 14 turns in a direction to align the major axis with said shortest line, the angularity of the side 19 of the wedge body 14 relative to the surface 10 decreases so that the flange 42 of the work will be wedged between the surface 10 and the overhanging portion of the side 19 of the body of the wedge.

The bodies of the wedge blocks may be made of any suitable material, such as steel, plastic or rubber, or of a combination thereof, depending upon the nature of the work to be held and the type of operation to be performed thereon. As illustrative of one way of constructing the wedge body, I have shown the left-hand one of the wedges 14 formed of a metallic body having a peripheral rim 44 of hardened rubber or plastic material, such rim being bonded to the body of the wedge 14 so as to be integral therewith. The body of the wedge 14 on the right-hand side (Fig. 1) is illustrated as being made entirely of metal, such as steel.

The wedge blocks 16 form stops and comprise circular discs of any suitable material, such for example as that described in connection with the wedge blocks 14, and in which the tapped and threaded hole 20 is positioned off center of the body 16 so that as the body 16 rotates about the cap screw 28, it will wedge itself between the cap screw 28 and the flange 42 of the work 40. The stops 16 may, like the wedges 14, have the threaded hole 20 and the cap screws 28 threaded so that on such movement the body of the stop 16 will tend to be clamped more firmly to the surface 10. Thus the piece of work 40 illustrated may be secured by employing two pair of wedge blocks 14 and 16 in the arrangement as illustrated. Obviously the diameters and the thicknesses of the blocks 14 and 16 may be varied from the proportions illustrated and for some work, washers may be employed under the blocks 14 and 16 and longer cap screws 28 used. It will be noted that the design of the wedge blocks 14 is such that increased lateral pressure can be put on the work coincidentally with increased downward pressure to hold the work to the machine surface 10. It should also be noted that the design of the cap screw 28 and the wrenches 26 and 36 is such that all work of positioning and holding the work 40 is done from the top of the surface 10, and that the design eliminates projections such as nuts, bolts, etc. above the top surfaces of the wedge blocks.

By using a combination of the parts described, work can be held directly on the machine surface for processing against lateral and vertical forces. Also, by proper positioning of the stops and wedges, many pieces can be properly positioned and held successively and accurately, the removal and replacing of work being accomplished by moving only one or two wedges or stops while the rest remain positioned accurately. The wedging action will force the new work into the same position as the piece removed. This enables the device to be used in production in lieu of a special fixture.

The set-up for a given operation can be made on a plate having regularly spaced drilled holes through which the cap screws hold the wedges; and having slotted legs with which the plate may be fastened to the machine surface. This would permit a semi-permanent set-up removable from the machine to permit intermittent operation on the machine.

While I have illustrated and described preferred embodiments of my invention, it is understood that these are capable of modification, and I therefore do not wish to be limited to the precise details set forth but desire to avail myself of such changes and alterations which fall within the purview of the following claims.

I claim:

1. Work holding means for holding work on surfaces such as T-slotted surfaces comprising one or more wedge block holders, each of said wedge block holders comprising a body having a pair of faces, at least one of which is adapted for supporting said body on said surface, a curved peripheral portion between said faces, a threaded hole extending between said faces, said threaded hole being eccentrically disposed relative to said curved peripheral portion, and a cap screw having a head, a threaded stem threadedly engageable in said threaded hole and a tool receiving socket in the end of said threaded stem, said cap screw head being cooperable with a shoulder on said surface for clamping said wedge block holder to said surface when said holder is threaded down on said threaded stem of said cap screw against said surface, said peripheral portion of said body being adapted to bear against a work piece positioned on said surface to hold said piece against movement on said surface in at least one direction, the exposed face of said body being provided with tool receiving sockets whereby said wedge body may be turned by means of a tool relative to said cap screw, when a tool is in the tool receiving socket thereof and holding said cap screw against rotation, so as to wedge said body between said cap screw and said work piece.

2. Work holding means for holding work on surfaces such as T-slotted surfaces comprising one or more wedge block holders, each of said wedge block holders comprising a body having a pair of faces, at least one of which is adapted for supporting said body on said surface, a curved peripheral portion between said face and a threaded hole extending between said faces, said threaded hole being eccentrically disposed relative to said curved peripheral portion, and a cap screw having a head, a threaded stem threadedly engageable in said threaded hole and a tool receiving means at the end of said threaded stem, said cap screw head being cooperable with a shoulder on said surface for clamping said wedge block holder to said surface when said holder is threaded down on said threaded stem of said cap screw against said surface, said peripheral portion of said body being adapted to bear against a work piece positioned on said surface to hold said piece against movement on said surface in at least one direction, the exposed face of said body being provided with tool receiving means whereby said wedge body may be turned by means of a tool relative to said cap screw when a tool is engaged with the tool receiving means at the end of said threaded stem holding said cap screw against rotation, so as to wedge said body between said cap screw and said work piece, at least said peripheral portion being formed of rubber-like material.

3. Work holding means for holding work on surfaces such as T-slotted surfaces comprising one or more wedge block holders, each of said wedge block holders comprising a body having a pair of faces, at least one of which is adapted for supporting said body on said surface, a curved peripheral portion between said faces and a threaded hole extending between said faces, said threaded hole being eccentrically disposed relative to said curved peripheral portion, and a cap screw having a head, a threaded stem threadedly engageable in said threaded hole and having tool receiving means at the end thereof, said cap screw head being cooperable with a shoulder on said surface for clamping said wedge block holder to said surface when said holder is threaded down on said threaded stem of said cap screw against said surface, said peripheral portion of said body being adapted to bear against a work piece positioned on said surface to hold said piece against movement on said surface in at least one direction, the exposed face of said body being provided with tool receiving means whereby said wedge body may be turned by means of a tool relative to said cap screw, when a tool is engaged with the tool receiving means on the stem thereof holding said cap screw against rotation, so as to wedge said body between said cap screw and said work piece, at least part of said peripheral portion being at an angle greater than 90° relative to said surface contacting face so as to provide a wedge surface for exerting pressure on said work piece toward said surface as said body is turned relative to said cap screw.

4. Work holding means for holding work on surfaces such as T-slotted surfaces comprising one or more wedge block holders, each of said wedge block holders comprising an oval body having a pair of faces, at least one of which is adapted for supporting said body on said surface, and a peripheral portion between said faces and a threaded hole extending between said faces, said threaded hole being eccentrically disposed relative to said peripheral portion, and a cap screw having a head, a threaded stem threadedly engageable in said threaded hole and having tool receiving means on the end of said threaded stem, said cap screw head being cooperable with a shoulder on said surface for clamping said wedge block holder to said surface when said holder is threaded down on said threaded stem of said cap screw against said surfaces, said peripheral portion of said body being adapted to bear against a work piece position on said surface to hold said piece against movement on said surface in at least one direction, the exposed face of said body being provided with tool receiving means whereby said wedge body may be turned by means of a tool relative to said cap screw, when a tool is engaged with the tool receiving means on said stem holding said cap screw against rotation so as to wedge said body between said cap screw and said work piece.

5. Work holding means for holding work on surfaces such as T-slotted surfaces comprising one or more wedge block holders, each of said wedge block holders comprising an oval body having a pair of faces, at least one of which is adapted for supporting said body on said surface, and a peripheral portion between said faces and a threaded hole extending between said faces, said threaded hole being eccentrically disposed relative to said peripheral portion, and a cap screw having a head, a threaded stem threadedly engageable in said threaded hole and a tool receiving socket in the end of said threaded stem, said cap screw head being cooperable with a shoulder on said surface for clamping said wedge block holder to said surface when said holder is threaded down on said threaded stem of said cap screw against said surface, said peripheral portion of said body being adapted to bear against a work piece positioned on said surface to hold said piece against movement on said surface in at least one direction, the exposed face of said body being provided with tool receiving sockets whereby said wedge body may be turned by means of a tool relative to said cap screw when a tool is in the tool receiving socket thereof and holding said cap screw against rotation so as to wedge said body between said cap screw and said work piece, said peripheral portion being normal to said faces on the minor diameter of said body and at an angle less than 90° relative to said surface contacting face on one side of said minor diameter and which angle decreases from said minor diameter to the major diameter of said body, said body being symmetrical relative to its major diameter.

6. Work holding means for holding work on surfaces such as T-slotted surfaces comprising one or more wedge block holders arranged adjacent a work piece positioned on said surface, each of said wedge block holders comprising a body having a pair of faces, at least one of which is adapted for supporting said body on said surface, a curved peripheral portion between said faces and a hole extending between said faces, said hole being eccentrically disposed relative to said curved peripheral portion, means extending through said hole and cooperable with a shoulder on said surface for clamping said wedge block holder to said surface, said peripheral portion of said body being adapted to bear against said work piece positioned on said surface to hold said piece against movement on said surface in at least one direction, the exposed face of said body being provided with a tool receiving means whereby said wedge body may be turned by means of a tool relative to said clamping means so as to wedge said body between said clamping means and said work piece.

ROBERT W. HODGE.

REFERENCES CITED

The following references are of record in the file of this patent:

UNITED STATES PATENTS

| Number | Name | Date |
|---|---|---|
| 1,433,252 | Barber | Oct. 24, 1922 |
| 1,938,337 | Janiszewski | Dec. 5, 1933 |
| 1,954,708 | Mass | Apr. 10, 1934 |
| 2,375,408 | Gallimore et al. | May 8, 1945 |
| 1,685,899 | Andrew | Oct. 2, 1928 |
| 1,756,851 | Clement | Apr. 29, 1930 |
| 1,213,599 | Dow | Jan. 23, 1917 |